US012754095B2

(12) United States Patent
Wetzig et al.

(10) Patent No.: US 12,754,095 B2
(45) Date of Patent: Oct. 6, 2026

(54) GAS LEAK DETECTION DEVICE AND GAS LEAK DETECTION METHOD FOR IDENTIFYING A GAS LEAK IN A TEST OBJECT

(71) Applicant: INFICON GMBH, Cologne (DE)

(72) Inventors: Daniel Wetzig, Cologne (DE); Marcel Ruth, Cologne (DE); Silvio Decker, Cologne (DE); Thomas Grellmann, Cologne (DE)

(73) Assignee: INFICON GMBH, Cologne (DE)

( * ) Notice: Subject to any disclaimer, the term of this patent is extended or adjusted under 35 U.S.C. 154(b) by 308 days.

(21) Appl. No.: 18/265,164

(22) PCT Filed: Dec. 1, 2021

(86) PCT No.: PCT/EP2021/083737

§ 371 (c)(1),
(2) Date: Jun. 2, 2023

(87) PCT Pub. No.: WO2022/135854

PCT Pub. Date: Jun. 30, 2022

(65) Prior Publication Data

US 2024/0019336 A1 Jan. 18, 2024

(30) Foreign Application Priority Data

Dec. 21, 2020 (DE) ..................... 10 2020 134 370.1

(51) Int. Cl.

| | |
|---|---|
| ***G01M 3/20*** | (2006.01) |
| ***G01M 3/26*** | (2006.01) |

(Continued)

(52) U.S. Cl.
CPC .............. *G01M 3/202* (2013.01); *G01M 3/26* (2013.01); *G01L 2019/0053* (2013.01);
(Continued)

(58) Field of Classification Search
CPC .......... G01M 3/04; G01M 3/20; G01M 3/202; G01M 3/26; G01M 3/205; G01M 3/3281;
(Continued)

(56) References Cited

U.S. PATENT DOCUMENTS

| | | | | |
|---|---|---|---|---|
| 3,520,176 A | | 7/1970 | Becker | |
| 5,343,740 A | * | 9/1994 | Myneni .................. | F04B 37/08 73/40.7 |

(Continued)

FOREIGN PATENT DOCUMENTS

| | | |
|---|---|---|
| CN | 108369151 A | 8/2018 |
| CN | 109312754 A | 2/2019 |

(Continued)

*Primary Examiner* — Benjamin R Schmitt
(74) *Attorney, Agent, or Firm* — Dickinson Wright PLLC

(57) ABSTRACT

A gas leak detection device for identifying a gas leak in a test object is disclosed, comprising a connector for the test object or a test chamber accommodating the test object, a vacuum pump connected to the connector for evacuating the test object or the test chamber, a gas detector connected to the vacuum pump and the connector and configured for detection of a first test gas and for integral leak detection or for localized leak detection of a gas leak in the test object according to the spraying principle during continuous operation of the vacuum pump, a gas pressure sensor connected to the vacuum pump and the connector.

10 Claims, 1 Drawing Sheet

Figure 1:
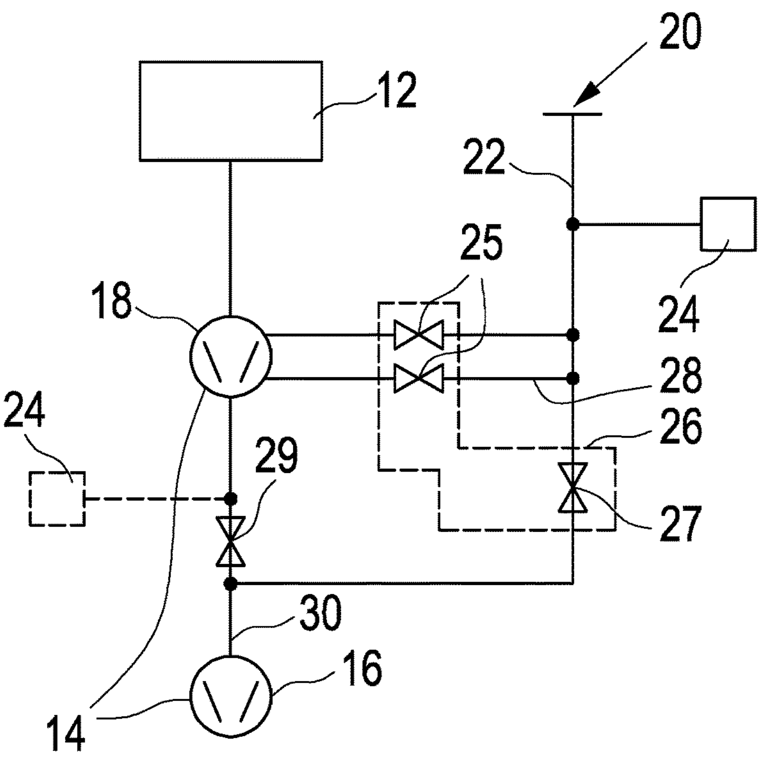

(51) Int. Cl.
*G01L 19/00* (2006.01)
*G01L 21/00* (2006.01)
*G01M 3/32* (2006.01)

(52) U.S. Cl.
CPC .......... *G01L 19/0092* (2013.01); *G01L 21/00* (2013.01); *G01M 3/205* (2013.01); *G01M 3/3281* (2013.01)

(58) Field of Classification Search
CPC ................ G01L 19/0092; G01L 21/00; G01L 2019/0053
See application file for complete search history.

(56) References Cited

U.S. PATENT DOCUMENTS

| | | | | |
|---|---|---|---|---|
| 5,625,141 | A | 4/1997 | Mahoney et al. | |
| 6,286,362 | B1 | 9/2001 | Coffman et al. | |
| 7,717,681 | B2 * | 5/2010 | Bohm | G01M 3/202 73/40.7 |
| 2002/0062689 | A1 | 5/2002 | Cote et al. | |
| 2019/0120715 | A1 | 4/2019 | Bruhns et al. | |

FOREIGN PATENT DOCUMENTS

| | | | |
|---|---|---|---|
| DE | 16 48 648 | A1 | 2/1972 |
| DE | 101 56 206 | A1 | 6/2002 |
| DE | 10 2014 223 841 | A1 | 5/2016 |
| EP | 1 620 706 | B1 | 5/2007 |
| TW | 201011272 | A1 | 3/2010 |
| TW | 201625911 | A | 7/2016 |

* cited by examiner

GAS LEAK DETECTION DEVICE AND GAS LEAK DETECTION METHOD FOR IDENTIFYING A GAS LEAK IN A TEST OBJECT

The invention relates to a gas leak detection device for identifying a gas leak in a test object as well as a corresponding method.

Generally, there are two possible ways for detecting a gas leak, namely the integral detection and the localizing detection. The integral detection offers two possibilities. First, the test object can be contained in a test chamber which is connected to a gas detector, wherein the test object has been or is pressurized with a test gas while the test chamber is evacuated. Second, alternatively, the test object contained in the test chamber or a test casing can be connected to the gas detector and evacuated while a test gas, e.g. ambient air, has been or is supplied to the test chamber or the test casing. By means of the integral leak detection, a leak can merely be detected but not localized.

For localizing a leak, the localizing detection is carried out without any test chamber according to the sniffing principle or according to the spraying principle. In the case of the sniffing principle, the test object is pressurized by means of a test gas and the outside of the test object is sniffed by a sniffing probe connected to a vacuum pump and a gas detector. In the case of the spraying principle, a spray pistol sprays the test object with a test gas from outside while the test object is connected to the vacuum pump and to the gas detector.

Such gas leak detection devices using helium or hydrogen as the test gas typically use a mass spectrometer as a gas detector, while the vacuum pump is a high-vacuum pump, such as a turbomolecular pump in combination with a fore-vacuum pump. For the localizing detection, the test object is evacuated with the aid of the vacuum pump and sprayed with a test gas from outside (spraying principle). For the integral tightness detection, the test object is pressurized with the aid of the test gas and placed into the test chamber. The test chamber is evacuated by the fore-vacuum pump, and the mass spectrometer measures the test gas content in the vacuum. The test gas content is a measure of the leak rate of a leak in the test object.

Such vacuum leak detectors are sold under the trade names UL3000 and UL5000 by INFICON®, for example. In these systems, an integral pressure increase measurement using a test chamber is carried out, subsequently to the localizing measurement, by spraying or sniffing the test object for the purpose of checking for the tightness of the system. Here, the test object is placed into a test chamber which is connected to the vacuum leak detector and is evacuated, while the test object is pressurized by means of the test gas. Alternatively, the test object is connected to the vacuum leak detector and evacuated, while the test chamber surrounding the test object has been or is pressurized by means of the test gas.

In DE 16 48 648 C3 the mass-spectrometric leak detection according to the counterflow principle is described. Here, a test container is connected to the inlet of a turbomolecular pump. In the test container, the test object to be checked for a leak can be located. The test object is filled with a test gas, such as helium, for example. The fore-pressure side of the turbomolecular pump is connected to a fore-vacuum pump. To an intermediate gas inlet between the turbomolecular pump and the fore-vacuum pump the discharge side of another turbomolecular pump is connected which evacuates the gas detector configured as a mass spectrometer. The two turbomolecular pumps are operated such that a test gas extracted from the test container is fed to the mass spectrometer, while the test container and the mass spectrometer are evacuated with the aid of the fore-vacuum pump.

In EP 1 620 706 B1, an arrangement for the counterflow leak detection is described where the high-vacuum pump evacuating into the test container is directly connected to the inlet of the leak detector and the test container connected to the inlet in an unthrottled manner and without any valve. Thereby, the suction capacity for helium is increased at the inlet and the response time to the test gas is reduced even when test objects having a large volume are connected.

In DE 101 56 206 A and DE 10 2014 223 841 A, assemblies of vacuum leak detectors having a booster pump are described. The booster pump is positioned as an additional turbomolecular pump in the inlet region of the vacuum leak detector in order to improve the suction capacity and thus the response time of the vacuum leak detector.

It is an object of the invention to provide an improved gas leak detection device which enables both a localizing gas leak detection on a test object and an integral measurement, as well as to provide a corresponding method.

The gas leak detection device according to the invention is defined by the features of claim 1. The method according to the invention is defined by the features of claim 8.

According to the invention, in addition to the vacuum pump and the gas detector connected to the vacuum pump, a gas pressure sensor is provided which is configured as a total pressure sensor for an integral measurement of the total pressure increase inside the test chamber or inside the test object (pressure increase method) and/or as a gas-selective partial pressure sensor for measuring the partial pressure increase of at least one second test gas different from the first test gas inside the test object or the test chamber (partial pressure increase method). The partial pressure sensor can e.g. detect the partial pressure of the gas by an optical spectral analysis of the second or the further test gas. A blocking device is provided and configured for separating, in terms of vacuum, the gas pressure sensor and the connector for the test object or the test chamber from the vacuum pump when the test object or the test chamber is examined by means of the gas pressure sensor.

This enables a particularly rapid measurement according to the pressure increase method or the accumulation principle, while the vacuum pump continues to operate. For the integral or localizing measurement by means of the gas detector, the first test gas is used, while for the integral pressure increase measurement by means of the gas pressure sensor, the at least second or further test gas is used. Stopping or interrupting the operation of the vacuum pump for the integral measurement according to the pressure increase method or the accumulation principle is not required since the blocking device separates, vacuum-wise, the gas pressure sensor and the test object or the test chamber from the vacuum pump during the measurement.

The vacuum pump can be a single vacuum pump or a vacuum pump of a vacuum pump system comprised of a plurality of vacuum pumps. In particular, the vacuum pump can be a high-vacuum pump of a vacuum pump system comprised of at least one fore-vacuum pump and at least one high-vacuum pump.

The gas spectrometer can be a mass spectrometer with a high-vacuum pump or an ultrahigh-vacuum pump, for example a turbomolecular pump, which uses the vacuum pump evacuating the test object or the test chamber as a fore-vacuum pump and evacuates the mass spectrometer to the atmosphere via the fore-vacuum pump. Here, the fore-vacuum pump and the high-vacuum pump can be referred to as a vacuum pump system. Alternatively, the gas detector can be a gas-specific optical gas detector or semiconductor sensor.

The gas pressure sensor can be a pressure gauge for measuring the total pressure increase inside the test chamber or inside the test object according to the pressure increase method. Alternatively or additionally, the gas pressure sensor can be configured as a gas-selective partial pressure sensor for measuring the partial pressure increase of the test gas. Here, the relative content of the test gas in the examined gas mixture is referred to as the partial pressure. The measurement of the partial pressure increase can be performed according to the accumulation method where the partial pressure increase of the gas accumulating in the measuring region is measured with the vacuum pump being shut off.

The gas pressure sensor can in particular be a membrane window sensor, an absorption-spectroscopic sensor, e.g. an infrared absorption sensor, an emission-spectroscopic sensor, e.g. an OES (optical emission spectroscopy) sensor, or semiconductor gas sensor, chemical gas sensor or optical gas sensor. In particular, the gas pressure sensor is not necessarily a pressure gauge. In the total pressure increase method, the gas pressure sensor measures the increase of the total pressure of a gas mixture which contains the second test gas. In the case of the partial pressure increase, the gas pressure sensor measures the increase of the partial pressure portion of the at least second test gas.

The optical spectral analysis described in an exemplary embodiment of the gas pressure sensor enables a particularly rapid evaluation of the total pressure and/or the partial pressure according to the pressure increase method or the accumulation principle.

The gas-selective partial pressure sensor preferably is an OES sensor configured for the optical emission spectroscopy.

Preferably, the pressure sensor is included in a gas conducting path or connected to the gas conducting path which connects the connector for the test object or the test chamber to the vacuum pump or to the gas detector.

The blocking device can be a selectively controllable blocking device which blocks under manual, electronical and/or pneumatical control. For this purpose, selectively operable or controllable valves can be used in the gas conducting paths to be blocked. Alternatively, the blocking device can comprise stop valves, butterfly valves or bellows gate valves for effecting the pressure-wise separation of the gas conducting path in terms of vacuum.

Preferably, the booster pump pumps during the measurement such that the gas in the test volume flowing out of a leak is compressed to the volume on the downstream side of the turbomolecular pump. Usually, the volume of the test chamber or the test object is many times larger than the volume in the region behind the compressing turbomolecular pump such that the pressure increase in this compressed gas volume is boosted approximately by the factor of the volume ratio.

Figure 2:
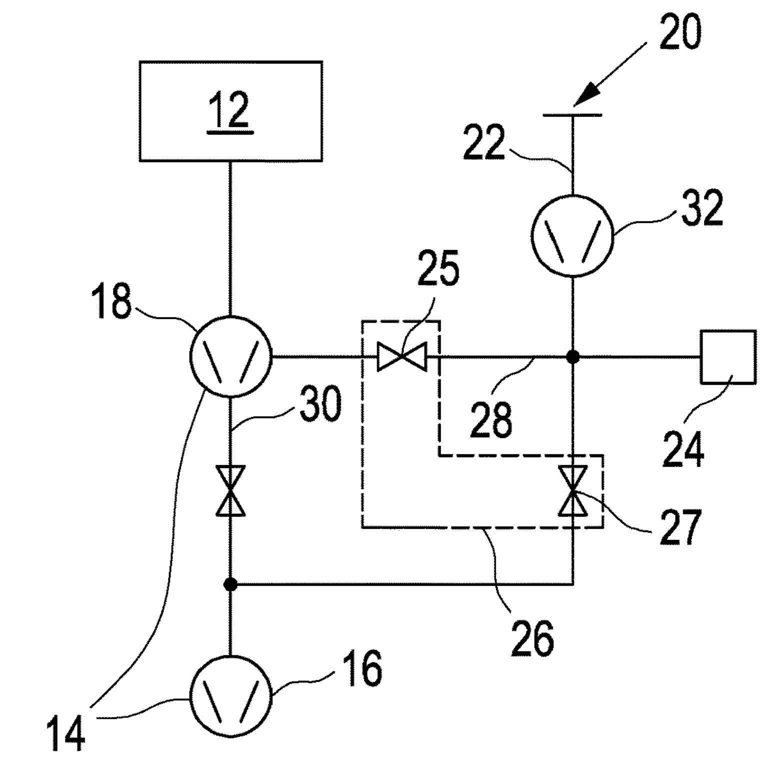

Hereunder, exemplary embodiments of the invention will be explained in detail with reference to the drawings in which:

FIG. 1 shows a schematic diagram of an exemplary embodiment without a booster pump, and FIG. 2 shows a schematic diagram of a corresponding exemplary embodiment with a booster pump.

Both figures show a gas leak detection device having the following components:

- a gas detector 12;
- a connector 20 for the test object or a test chamber accommodating the test object;
- a vacuum pump 16 for evacuating a test object connected to the connector 20 and the gas detector 12.

A gas conducting path 22 connects the connector 20 to the vacuum pump 16.

The gas detector 12 of the illustrated exemplary embodiment is a mass spectrometer which is evacuated by a turbomolecular pump 18. Here, the gas detector 12 and the turbomolecular pump 18 can be referred to as a detector system. The outlet of the turbomolecular pump 18 is connected to the inlet of the vacuum pump 16 and uses the inlet of the vacuum pump 16 as a fore-vacuum pump. Thus, the vacuum pump 16 and the turbomolecular pump 18 constitute a vacuum pump 14. The outlet of the vacuum pump 16 is open towards the atmosphere.

According to the invention, a gas pressure sensor 24, which can be a total pressure sensor and/or a gas-selective partial pressure sensor, e.g. configured as an OES (optical emission spectroscopy) sensor, is connected to the gas conducting path 22. For this purpose, upstream of the gas pressure sensor 24, i.e. between the gas pressure sensor 24 and the gas conducting path 22, a blocking device 26 is provided via which the gas pressure sensor 24 is connected to the gas conducting path 22. The blocking device 26 is configured for creating a gas-conveying connection between the connector 20 and the gas pressure sensor 24, while the connection between the connector 20 and the remaining components, i.e. in particular the gas detector 12 and the vacuum pump 16, is disconnected. In the simplest case, the blocking device 26 can be a switch which optionally interconnects the gas conducting path 22 between the connector 20 and the vacuum pump 16 and blocks the connection to the gas pressure sensor 24, or vice versa. The switch can be a shuttle valve or a 3-2-way valve.

For a simplified illustration, the blocking device 26 is shown in the figures as a box extending across the gas conducting paths 22, 28 for illustrating that the blocking device can block the gas conducting paths 22, 28. This can be realized by a controllable valve 27 in the gas conducting path 22 for blocking the connection between the connector 20, the gas pressure sensor 24 and the vacuum pump 16. In addition, in the illustrated exemplary embodiments, the blocking device comprises a controllable valve 25 for blocking the gas conducting path 28 which connects the mass spectrometric high-vacuum pump 18, i.e. the high-vacuum pump connected to the gas detector 12, to the connector 20 and the gas pressure sensor 24. Thus, in the exemplary embodiments illustrated in the figures at least a portion of the blocking device 26 is included in the gas conducting path 22 for blocking the gas conducting path 22.

Another possible arrangement of the gas pressure sensor 24 is shown in dashed lines in FIG. 1. Thus, the gas pressure sensor 24 can be connected to the gas conducting path 30 which connects the fore-vacuum pump 16 to the turbomolecular pump 18. In this case, the blocking device 26 is constituted by the controllable valve 29 in the gas conducting path 30.

Corresponding arrangements of the blocking device 26 and the gas pressure sensor 24 are also conceivable in the exemplary embodiment illustrated in FIG. 2 but the corresponding arrangements are not indicated in FIG. 2.

In FIG. 2, an additional booster pump 32 configured as a turbomolecular pump is included in the gas conducting path 22 for evacuating the connector 20 via the vacuum pump 16. Preferably, the gas pressure sensor 24 and the blocking device 26 are connected to the gas conducting path 22 downstream of the booster pump 32 and upstream of the vacuum pump 16, i.e. connected to the portion of the gas conducting path 22 that connects the booster pump 32 to the fore-vacuum pump 16.

The invention claimed is:

1. A gas leak detection device for identifying a gas leak in a test object, comprising a connector for the test object or for a test chamber accommodating the test object;

a vacuum pump connected to the connector for evacuating the test object or test chamber;

a gas detector connected to the vacuum pump and to the connector and configured for detection of a first test gas and for integral leak detection or for localized leak detection of a gas leak in the test object according to the spraying principle during continuous operation of the vacuum pump, a gas pressure sensor connected to the vacuum pump and to the connector and configured for integral measurement of the total pressure increase at the connector according to the pressure increase method, and a blocking device configured for separating, in terms of vacuum, the gas pressure sensor and the connector from the vacuum pump when the test object is examined by means of the gas pressure sensor; and wherein a gas conducting path connecting the connector to the vacuum pump comprises a booster pump, and the gas pressure sensor is arranged in the gas conducting path between the booster pump and the vacuum pump and thus downstream of the booster pump and upstream of the vacuum pump.

2. The gas leak detection device according to claim 1, wherein the gas pressure sensor is connected to a gas conducting path which connects the connector to the vacuum pump and/or to the gas detector such that the gas pressure sensor measures the gas upstream of the vacuum pump and the gas detector, respectively.

3. The gas leak detection device according to claim 1, wherein the gas pressure sensor is configured for an optical spectral analysis of the second test gas.

4. The gas leak detection device according to claim 1, wherein the gas detector is a mass spectrometer having a high-vacuum pump, in the gas conducting path connecting the gas detector to the vacuum pump, and the blocking device is configured for separating, in terms of vacuum, the gas pressure sensor and the connector from the high-vacuum pump when the test object is examined by means of the gas pressure sensor.

5. The gas leak detection device according to claim 1, wherein the gas pressure sensor is configured for integral measurement of the partial pressure increase of the second test gas at the connector according to the accumulation principle.

6. A gas leak detection method for identifying a gas leak in a test object, comprising the following steps in any order:

determining a gas leak in the test object by supplying a first test gas to the test object or to a test chamber surrounding the test object and detecting the first test gas on the basis of integral leak detection or on the basis of localizing leak detection according to the spraying principle during continuous evacuation of the test object or of the test chamber by means of a vacuum pump, and identifying a gas leak in the test object by supplying at least one second test gas different from the first test gas to the test object or to the test chamber, and by integral measurement of the total pressure increase in the test object or the test chamber according to the pressure increase method, while the test object or the test chamber and the gas pressure sensor are disconnected from the vacuum pump and thus the test object or the test chamber is not evacuated;

wherein the total pressure increase is measured in a gas conducting path which connects the outlet of a booster pump, whose inlet is connected to the connector for the test object or the test chamber, to the vacuum pump and/or to a gas detector such that the total pressure increase is measured downstream of the booster pump and upstream of the vacuum pump and/or the gas detector.

7. The gas leak detection method according to claim 6, wherein the total pressure increase and/or the partial pressure increase of the second test gas are measured in a gas conducting path which connects a connector for the test object or the test chamber accommodating the test object to the vacuum pump and/or to the gas detector, or measured in an increased or decreased measuring volume connected to the gas conducting path.

8. The gas leak detection method according to claim 6, wherein the partial pressure increase of one or a plurality of different components of air is measured.

9. The gas leak detection method according to claim 6, wherein the partial pressure increase of the test gas is measured by analyzing the optical spectrum of the test gas.

10. The gas leak detection method according to claim 6, wherein the total pressure increase and/or the partial pressure increase of the second test gas are measured in a gas conducting path which connects a high-vacuum pump of the gas detector to the connector and to the gas pressure sensor, or measured in an increased or decreased measuring volume connected to the gas conducting path.

* * * * *